United States Patent [19]

Sikora

[11] Patent Number: 6,156,823
[45] Date of Patent: Dec. 5, 2000

[54] BISMUTH OXIDE CATALYST FOR CATHODIC ELECTROCOATING COMPOSITIONS

[75] Inventor: Robert John Sikora, Northville, Mich.

[73] Assignee: E. I. du Pont de Nemours and Company, Wilmington, Del.

[21] Appl. No.: 09/205,771

[22] Filed: Dec. 4, 1998

[51] Int. Cl.[7] ................................ C08J 3/00; C08K 3/20; C08L 63/00; C08L 75/00; C08G 18/08
[52] U.S. Cl. ........................ 523/415; 428/413; 428/423.1; 523/402; 523/404; 523/414; 523/417; 524/591; 524/839; 524/840; 528/44; 528/55
[58] Field of Search ..................................... 524/591, 839, 524/840; 523/402, 404, 414, 415, 417; 428/413, 423.1; 528/44, 55

[56] References Cited

U.S. PATENT DOCUMENTS

| | | | |
|---|---|---|---|
| 3,922,253 | 11/1975 | Jerabek et al. | 260/77.5 |
| 4,137,140 | 1/1979 | Belanger | 204/181 |
| 4,419,467 | 12/1983 | Wismer et al. | 523/474 |
| 4,468,307 | 8/1984 | Wismer et al. | 204/181 |
| 5,330,839 | 7/1994 | Yasuoka et al. | 428/413 |
| 5,405,701 | 4/1995 | Fujibayashi et al. | 428/418 |
| 5,507,928 | 4/1996 | Bohmert et al. | 204/488 |
| 5,523,363 | 6/1996 | Fujibayashi et al. | 525/481 |
| 5,554,700 | 9/1996 | Schipfer et al. | 525/360 |
| 5,670,441 | 9/1997 | Foedde et al. | 502/200 |
| 5,702,581 | 12/1997 | Kerlin et al. | 204/486 |
| 5,753,726 | 5/1998 | Reuter et al. | 523/492 |
| 5,773,090 | 6/1998 | Buttner et al. | 427/327 |
| 5,804,051 | 9/1998 | Boyd et al. | 204/501 |

FOREIGN PATENT DOCUMENTS

| | | |
|---|---|---|
| 0 509 437 A1 | 10/1992 | European Pat. Off. . |
| 06100805 | 4/1994 | Japan . |
| 06248203 | 6/1994 | Japan . |
| 06200194 | 7/1994 | Japan . |
| 10204338 | 4/1998 | Japan . |
| 95/04093 | 2/1995 | WIPO . |
| WO 98/10024 | 3/1998 | WIPO . |

*Primary Examiner*—Patrick D. Niland
*Attorney, Agent, or Firm*—Hilmar L. Fricke; Steven C. Benjamin

[57] ABSTRACT

An improved aqueous cathodic electrocoating composition having a binder of an epoxy-amine adduct and a blocked polyisocyanate crosslinking agent; wherein the improvement is the use of a catalytic amount of bismuth trioxide dispersed in the electrocoating composition.

7 Claims, No Drawings

BISMUTH OXIDE CATALYST FOR CATHODIC ELECTROCOATING COMPOSITIONS

BACKGROUND OF THE INVENTION

This invention is directed to a cathodic electrocoating composition and in particular to a cathodic electrocoating composition containing a bismuth oxide catalyst.

The coating of electrically conductive substrates by an electrodeposition process, also called an electrocoating process, is a well known and important industrial process. Electrodeposition of primers to metal automotive substrates is widely used in the automotive industry. In this process, a conductive article, such as an autobody or an auto part, is immersed in a bath of a coating composition of an aqueous emulsion of film forming polymer and the article acts as an electrode in the electrodeposition process. An electric current is passed between the article and a counter-electrode in electrical contact with the coating composition, until a coating of a desired thickness is deposited on the article. In a cathodic electrocoating process, the article to be coated is the cathode and the counter-electrode is the anode.

Film forming resin compositions used in the bath of a typical cathodic electrodeposition process also are well known in the art. These resins typically are made from polyepoxide resins which have been chain extended and then an adduct is formed to include amine groups in the resin. Amine groups typically are introduced through a reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives such as a catalyst to form the electrocoating bath. The electrocoating bath is placed in an insulated tank containing the anode. The article to be coated is the cathode and is passed through the tank containing the electrodeposition bath. The thickness of the coating that is deposited on the article being electro-coated is a function of the bath characteristics, the electrical operating characteristics of the tank, the immersion time, and the like.

The resulting coated article is removed from the bath and is rinsed with deionized water. The coating on the article is cured typically in an oven at sufficient temperature to form a crosslinked finish on the article. The presence of the catalyst enhances the crosslinking of the finish.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

Typical catalysts that have been used are lead and tin compounds such as dibutyl tin oxide which in some European countries have been held to be ecologically objectionable and regulations have been enacted to prevent the use of such metal catalysts. There is a need for a catalysts that will adequately catalyze the crosslinking reaction after the electrocoating composition has been electrodeposited on a substrate. Bismuth is acceptable for use in a catalyst. U.S. Pat. No. 5,554,700 to Schipfer et al issued Sep. 10, 1996 shows the use of bismuth salts of aliphatic hydroxy carboxylic acids and states that salts of relatively long chain acids such as Bi octanoate cause defects in coatings due to oil like extrusions and that inorganic bismuth compounds are difficult to disperse and are of low catalytic activity. U.S. Pat. No. 5,670,441 to Foedde et al issued Sep. 23, 1997 shows catalyst of bismuth compounds that are dissolved in an aqueous acid to make them water soluble. U.S. Pat. No. 5,330,839 to Yasuoka et al issued Jul. 19, 1994 shows the use of bismuth compounds with dialkyl tin aromatic carboxylate of an aromatic carboxylic acid. There is a need for a metal catalyst that has acceptable catalytic activity, is ecologically acceptable throughout the world, and is readily dispersed in an electrocoating composition and does not require the presence of other metal catalysts to be effective.

SUMMARY OF THE INVENTION

An improved aqueous cathodic electrocoating composition having a binder of an epoxy-amine adduct and a blocked polyisocyanate crosslinking agent; wherein the improvement is the use of a catalytic amount of bismuth trioxide dispersed in the electrocoating composition.

DETAILED DESCRIPTION OF THE INVENTION

Bismuth trioxide when adequately dispersed in an electrocoating composition is an effective catalyst for the reaction between the epoxy amine adduct and the polyisocyanate crosslinking agent under conventional baking conditions after the composition has been cathodically electrodeposited on a substrate. Typically, the bismuth trioxide is incorporated into the pigment dispersions used in the formulation of the electrocoating composition. Generally, a catalytic amount of bismuth trioxide is used in the electrocoating composition such as in amounts of 0.1–5% by weight, based on the weight of the film forming binder of the composition. It has been found that bismuth trioxide has approximately the same catalytic activity as the conventional tin and lead catalysts such as dibutyl tin oxide. Cure response of bismuth trioxide, as measured by the coatings resistance to solvents is as good as and at times better than conventional tin and lead catalysts. Corrosion resistance, chip resistance and adhesion are not adversely affected by the bismuth trioxide catalyst in comparison to the conventional catalysts that are currently being used.

The epoxy amine adduct of the novel coating composition is the reaction product of an epoxy resin of a polyglycidyl ether and a polyphenol and an amine. The resulting epoxy amine adduct has reactive amine and epoxy groups. The epoxy resin which is a poly epoxy hydroxy ether resin has a 1,2-epoxy equivalency of about two or more, that is, a polyepoxide which has on an average basis two or more epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,bis-(4-hydroxyphenyl)ethane, 2-methyl-1,1-bis-(4-hydroxyphenyl)propane, 2,2-bis-(4-hydroxy-3-tertiarybutylphenyl)propane, 1,1-bis-(4-hydroxyphenol)ethane, bis-(2-hydroxynaphthyl)methane, 1,5-dihydroxy-3-naphthalene or the like.

Besides polyhydric phenols, other cyclic polyols can be used such as alicyclic polyols, particularly cycloaliphatic polyols, such as 1,2-bis(hydroxymethyl)cyclohexane, 1,3-bis-(hydroxymethyl)cyclohexane, 1,2 cyclohexane diol, 1.4, cyclohexane diol and hydrogenated bisphenol A.

The polyepoxides have molecular weights of at least 200 and preferably within the range of 200 to 3000, and more preferably about 340 to 2000.

The polyepoxide resin can be chain extended for example with any of the aforementioned polyhydric phenols such as bisphenol A and ethoxylated bisphenol A and preferably a combination of these phenols. Also, the polyepoxides can be chain extended with a polyether or a polyester polyol which enhances flow and coalescence. Typical useful chain extenders are polyols such as polycaprolactone diols such as Tone 200® series available from Union Carbide Corporation and ethyoxylated bisphenol A such as SYNFAC 8009® available from Milliken Chemical Company.

Examples of polyether polyols and conditions for chain extension are disclosed in U.S. Pat. No. 4,468,307. Examples of polyester polyols for chain extension are disclosed in Marchetti et al U.S. Pat. No. 4,148,772 issued Apr. 10, 1979.

The amines used to prepare the epoxy amine adduct can be primary or secondary amines or mixtures thereof. Preferred amines are monoamines, particularly hydroxyl containing amines such as alkanol amines, dialkanol amines, trialkanol amines, alkyl alkanol amines, arylalkanol amines and arylalkylalkanolamines containing from 2–18 carbon atoms in the aryl, alkyl and aryl chains. Typically, useful amines include ethanolamine, methyl ethanol amine, N-methyl-ethanolamine, diethanolamine, N-phenylethanolamine, and the like. Other amines that can be used are set forth in U.S. Pat. No. 4,419,467 which is hereby incorporated by reference.

The cathodic binder of the epoxy amine adduct and the blocked isocyanate are the principal resinous ingredients in the electrocoating composition and are usually present in amounts of about 30 to 50% by weight of solids of the composition. The binder is neutralized with an acid to form a water soluble product. Typically useful acids are lactic acid, acetic acid, formic acid, sulfamic acid, alkane sulfonic acids such as methane sulfonic acids, ethane sulfonic acid, propane sulfonic acid and the like. To form an electrocoating bath, the solids of the electrocoating composition are generally reduced with an aqueous medium to the desired bath solids.

A blocked polyisocyanate crosslinking agent is used in the electrocoating composition. Preferred crosslinker agents for the above adduct are also well known in the prior art. These are aliphatic, cycloaliphatic and aromatic isocyanates such as hexamethylene diisocyanate, cyclohexamethylene diisocyanate, toluene diisocyanate, methylene diphenyl diisocyanate polymeric methylene diphenyl diisocyanate and the like. These isocyanates are pre-reacted with a blocking agent such as oximes, alcohols, or caprolactams which block the isocyanate functionality, i.e., the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

Besides the binder resin described above, the electrocoating composition usually contains pigment which is incorporated into the composition in the form of a pigment paste. The pigment paste is prepared by grinding or dispersing a pigment into a grinding vehicle with the bismuth trioxide catalyst and other optional ingredients such as anticratering agents wetting agents, surfactants, and defoamers. Any of the pigment grinding vehicles that are well known in the art can be used. Typically, grinding is done using conventional equipment known in the art such as an Eiger mill Dynomill or sand mill. After grinding, the particle size of the pigment should be as small as practical, generally, the particle size is about 6–8 using a Hegman grinding gauge.

Viscosity of the pigment dispersion before it is ground or milled is important. B Brookfield viscosity typically is used determined in accordance with ASTM D-2196. While the desired viscosity will vary with the selected components, viscosity generally will be in the range of 8000 centipoise to 1500 centipoise (0.8 Pa.s to 115 Pa.s) to achieve a fine grind during grinding. Viscosity typically increases during grinding and is readily adjusted by modifying the amount of water present.

Pigments which can be used in this invention include titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have been found to adversely affect coalescence and flow.

The electrocoating compositions of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight resin solids.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentrations of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

Typical electrocoating conditions are 200–270 volts and an immersion time sufficient to obtain a cured coating of 0.5–1.5 mils (13–38 microns), preferably 0.8–1.2 mils (20–30 microns). After electrodeposition, the coated substrate is baked to a metal temperature of 300 to 360 F. (149 to 182 C.) for a sufficient time to cure the coating, typically about 10 minutes.

Coating voltages, rupture voltages, bath stability of electrocoating baths formulated with the bismuth trioxide and corrosion performance of film containing the bismuth trioxide catalyst are the same as or very similar to metal catalysts such as dibutyl tin oxide.

The following example illustrates the invention. All parts and percentages are on a weight basis unless otherwise indicated.

EXAMPLES

The following emulsion was prepared and then electrocoating composition were prepared with pigment pastes made with dibutyl tin oxide catalyst and with bismuth trioxide catalyst and the properties of these compositions were compared.

Chain Extended Polyepoxide Resin Binder

The following ingredients were charged into a suitable reaction vessel:

1478 parts Epon 828® (epoxy resin of diglycidyl ether of bisphenol A having an epoxy equivalent weight of 188);

427 parts bisphenol A (4,4'-isopropylidenediphenol Shell Chemical Company);

533 parts ethoxylated bisphenol A having a hydroxy equivalent weight of 247 (Synfac 8009® from Milliken Company) and 121 parts xylene;

The resulting reaction mixture was heated to 146° C. under nitrogen blanket and 5.1 parts of dimethyl benzyl amine were added and the reaction mixture was allowed to exotherm to 158 C. until an epoxy equivalent weight of 1050 was obtained (determined according to ASTM-1652). The reaction mixture was cooled to 98 C. and 168 parts diketimine (reaction product of diethylenetriamine and methylisobutyl ketone having a nonvolatile content of 72.7%) and 143 parts ethyl ethanolamine were added. The resulting mixture was allowed to exotherm to 120 C. and held at this temperature for 1 hour. The reaction mixture was cooled below 115 C. and then 727 parts methylisobutyl ketone were added. The resulting resin solution had a nonvolatile content of 75%.

Crosslinking Resin Solution 400.27 parts "Isonate" 2181 (methylene diphenyl diisocyanate, Dow Chemical Company); 94.41 parts methylisobutyl ketone and 0.086 parts of dibutyl tin dilaurate were charged into a suitable reaction vessel and heated to 37 C. 259.73 parts of glycol ether alcohol blend (methanol, ethanol and diethyleneglycol monobutyl ether in a 1:1:1.32 equivalent ratio) was slowly charged into a reaction vessel while maintaining the reaction mixture below 93 C. The reaction mixture was held at this temperature until essentially all of the isocyanate was reacted as indicated by an infrared scan of the reaction mixture. 2.30 part of butanol and 123.3 parts of methylisobutyl ketone were added. The resulting resin solution had a nonvolatile content of 75%.

Quaternizing Agent

The quaternizing agent was prepared under a nitrogen blanket by adding 87 parts dimethyethanol amine to 320 parts ethylhexanol half-capped toluene diisocyanate (PPG Industries) to a reaction vessel at room temperature. An exothermic reaction occurred and the reaction mixture was stirred for one hour and held at a temperature of 80 C. 118 parts aqueous lactic acid solution (75% nonvolatile content) were added followed by the addition of 39 parts 2-butoxy ethanol. The reaction mixture was held for about one hour at 65 C. with constant stirring.

Pigment Grinding Vehicle

The following constituents were charged into a suitably equipped reaction vessel:

710 parts "Epon 829" (diglycidyl ether of bisphenol A having an epoxide equivalent weight of 193–203);

290 parts bisphenol A;

The constituents were heated to 150–160 C. under a nitrogen blanket to initiate an exothermic reaction. The temperature reached 180–200 C. and was cooled to 180 C. and held at this temperature until the molecular weight reached 800 (determined according to ASTM D-1652). The reaction mixture was cooled to 120 C. and 496 parts of 2-ethylhexanol half capped toluene diisocyanate were added. The temperature of the reaction mixture was held at 110 C. to 120 C. for one hour followed by the addition of 1095 parts 2-butoxyethanol and the reaction mixture was cooled to 85–90 C. 71 parts of deionized water were added followed by the addition of 496 parts of the above prepared quaternizing agent. The temperature of the reaction mixture was held at 85–90 C. until an acid value of about 1 was reached.

Emulsion

The following constituents were charged into a mixing vessel to form an emulsion:

|  | Part by Weight |
|---|---|
| Chain extended polyepoxide resin binder (prepared above) | 1,255.31 |
| Crosslinking resin solution (prepared above) | 805.85 |
| Surfactant {mixture of 120 parts coconut fatty alkyl hydroxy imidazoline, 120 parts "Surfynol" 104 (acetylene alcohol, 120 parts 2-butoxy ethanol, 221 parts deionized water and 19 parts lactic acid)} | 13.62 |
| Lactic acid | 27.24 |
| Deionized water | 1,897.88 |
| Total | 4,000.00 |

Preparation of Pigment Dispersions

The following pigment dispersions were prepared by charging the constituents into a suitable mixing container and then charging the resulting mixture into a sand mill and grinding until a Hegman reading of 7 or greater was reached.

| Dispersion 1 (Lead pigment and dibutyl tin oxide (DBTO) catalyst) | |
|---|---|
|  | Parts by Weight |
| Deionized water | 33.00 |
| Quaternary ammonium salt (prepared above) | 18.11 |
| Carbon black pigment | 1.35 |
| Dibutyl tin oxide paste (44.32% solids) | 9.95 |
| Aluminum silicate pigment | 5.42 |
| Lead silicate pigment | 2.17 |
| Titanium dioxide pigment | 26.14 |
| Deionized water | 3.85 |
| Total | 100.00 |

| Dispersion 2 (Lead pigment and bismuth trioxide (Bi₂O₃) catalyst) | |
| --- | --- |
| | Parts by Weight |
| Deionized water | 37.63 |
| Quaternary ammonium salt (prepared above) | 20.28 |
| Carbon black pigment | 1.35 |
| Bismuth trioxide | 3.15 |
| Aluminum silicate pigment | 5.42 |
| Lead silicate pigment | 2.17 |
| Titanium dioxide pigment | 26.14 |
| Deionized water | 3.85 |
| Total | 100.00 |

| Dispersion 3 (Lead free pigment and dibutyl tin oxide (DBTO) catalyst) | |
| --- | --- |
| | Parts by Weight |
| Deionized water | 33.00 |
| Quaternary ammonium salt (prepared above) | 18.11 |
| Carbon black pigment | 1.35 |
| Dibutyl tin oxide paste (44.32% solids) | 9.95 |
| Aluminum silicate pigment | 5.42 |
| "Nalzin" 2 pigment | 2.17 |
| Titanium dioxide pigment | 26.14 |
| Deionized water | 3.85 |
| Total | 100.00 |

| Dispersion 4 (Lead free pigment and bismuth trioxide (Bi₂O₃) catalyst) | |
| --- | --- |
| | Parts by Weight |
| Deionized water | 37.63 |
| Quaternary ammonium salt (prepared above) | 20.28 |
| Carbon black pigment | 1.35 |
| Bismuth trioxide | 3.15 |
| Aluminum silicate pigment | 5.42 |
| "Nalzin" 2 pigment | 2.17 |
| Titanium dioxide pigment | 26.14 |
| Deionized water | 3.85 |
| Total | 100.00 |

Preparation of Electrocoating Baths 1–4

The following Electrocoating Baths 1–4 were prepared by mixing together the above emulsion and pigment dispersions:

| | Parts by Weight | | | |
| --- | --- | --- | --- | --- |
| | Bath 1 | Bath 2 | Bath 3 | Bath 4 |
| Dispersion 1 (DBTO) | 418 | — | — | — |
| Dispersion 2 (Bi₂O₃) | — | 418 | — | — |
| Dispersion 3 (DBTO lead free pigment) | — | — | 418 | — |
| Dispersion 4 (Bi₂O₃ lead free pigment) | — | — | — | 418 |
| Emulsion (prepared above) | 1299 | 1299 | 1299 | 1299 |
| Deionized Water | 2252 | 2252 | 2252 | 2252 |

Electrocoating Baths 1–4 were prepared by mixing the above ingredients. Each bath was then ultrafiltered. Phosphatized steel panels were electrocoated in each bath at 250–310 volts to obtain a film 0.8–0.9 mils (20.3–25.4 microns) thick on each panel. The electrocoated panels were baked under the following conditions in an electric oven:

Under bake condition—330 F. (165 C.) for 17 minutes
Normal bake condition—360 F. (182 C.) for 17 minutes
Over bake condition—390 F. (199 C.) for 17 minutes The above prepared panel were tested for solvent resistance by a standard rub test (double rubs with methyl ethyl ketone soaked rag) and for corrosion resistance (GM 9540 Accelerated Corrosion Test in which panels are exposed to 40 repeated cycles of high humidity, salt spray and drying and the corrosion from a scribe mark cut through the coating to the metal substrate is measured in mm; an acceptable rating is less than 5 mm). The results of these tests are as follows:

| | DBTO CATALYST | | Bi₂O₃ CATALYST | |
| --- | --- | --- | --- | --- |
| Solvent Resistance | BATH 1 | BATH 2 LEAD FREE | BATH 3 | BATH 4 LEAD FREE |
| UNDER BAKE | 100 | 60 | 4 | 8 |
| NORMAL BAKE | 100⁺ | 100 | 100 | 100⁺ |
| OVER BAKE | — | — | — | 65 |
| CORROSION RESISTANCE | | | | |
| UNDER BAKE | 2.35 mm | 2.47 mm | — | 3.57 mm |
| NORMAL BAKE | 3.07 mm | 3.29 mm | — | 2.56 mm |
| OVERBAKE | 1.34 mm | 1.56 mm | — | 2.53 mm |

The dash (—) in the above table shows that the test was not conducted.

The above results show that Baths 3 and 4 containing the bismuth trioxide catalyst had solvent resistance equal to the metal catalyst of dibutyl tin oxide under normal baking conditions and is an acceptable catalyst. It does not have acceptable solvent resistance when under baked. The corrosion resistance data shows that Bath 4 containing the bismuth trioxide had acceptable corrosion resistance as did Baths 1 and 2 which contained dibutyl tin oxide as the catalyst.

I claim:

1. An improved aqueous cathodic electrocoating composition having a binder of an epoxy-amine adduct and a blocked polyisocyanate crosslinking agent; wherein the improvement is the use of a catalytic amount of bismuth trioxide dispersed in the electrocoating composition and the composition is free of any tin compounds.

2. The improved electrocoating composition of claim 1 wherein the composition is free of any lead and tin compounds.

3. The improved electrocoating composition of claim 2 in which the bismuth trioxide catalyst is used in an amount of 0.1–5% by weight, based on the weight of the binder.

4. The improved electrocoating composition of claim 3 in which the adduct comprises a polyepoxy hydroxy ether resin extended with a dihydric phenol and reacted with an amine.

5. In an improved method of preparing a cathodic electrocoating composition comprising the following steps in any workable order:

(a) preparing an epoxy amine adduct of an epoxy resin extended with a dihydric phenol and reacted with an amine;

(b) preparing a blocked polyisocyanate crosslinking agent;

(c) blending the epoxy amine adduct with the blocked polyisocyanate crosslinking agent;
(d) neutralizing the epoxy amine adduct with an organic or inorganic acid to form an emulsion;
(e) forming a pigment dispersion and blending the pigment dispersion with the neutralized emulsion;

wherein the improvement consist of adding a catalytic amount of bismuth trioxide to the pigment dispersion and the composition is free of any tin compounds.

6. The improved method of claim 5 in which the composition is free of any lead and tin compounds.

7. A substrate coated with the dried and cured composition of claim 1.

* * * * *